US012325375B2

(12) United States Patent
Faruque et al.

(10) Patent No.: US 12,325,375 B2
(45) Date of Patent: Jun. 10, 2025

(54) VEHICLE ENERGY ABSORBING DEVICE

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US); Yali Li, Saline, MI (US); James Chih Cheng, Troy, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 891 days.

(21) Appl. No.: 17/004,605

(22) Filed: Aug. 27, 2020

(65) Prior Publication Data

US 2022/0063538 A1     Mar. 3, 2022

(51) Int. Cl.
*B60R 21/04*      (2006.01)
*B60N 2/00*       (2006.01)
(Continued)

(52) U.S. Cl.
CPC ........ *B60R 21/0428* (2013.01); *B60N 2/0022* (2023.08); *B60R 21/01516* (2014.10);
(Continued)

(58) Field of Classification Search
CPC .............. B60R 21/01; B60R 21/01512; B60R 21/01538; B60R 21/01516; B60R 21/0428; B60R 2021/01252; B60R 2021/01204; B60R 2021/01286; B60R 2021/0414; B60R 21/055; B60R 21/04; B60R 21/0421; B60R 21/045; B60R 2021/0266; B60R 2021/0435; B60R 2021/0442; H05B 1/0236; H05B 3/0014; H05B 2203/004;
(Continued)

(56) References Cited

U.S. PATENT DOCUMENTS 3,930,665 A  *  1/1976  Ikawa ................. B60R 21/045
                                                       293/133
5,967,594 A  *  10/1999  Ramanujam .......... B60N 2/78
                                                       280/751
(Continued)

FOREIGN PATENT DOCUMENTS

EP       1464548 A1  *  10/2004  ............ B60R 21/04
JP    2013184633 A   *  9/2013

OTHER PUBLICATIONS

Duffy et al., Damping of high-temperature shape memory alloys, NTRS-NASA Technical Reports Server, Jan. 1, 2008 (Year: 2008).*

*Primary Examiner* — Amy R Weisberg
*Assistant Examiner* — Wenwei Zhuo
(74) *Attorney, Agent, or Firm* — Frank A. Mackenzie; Brooks Kushman P.C.

(57) ABSTRACT

A vehicle door interior trim assembly includes a trim panel and an armrest supported by the trim panel. The armrest includes an energy absorbing device. The energy absorbing device includes an inboard panel and an outboard panel. The outboard panel is between the inboard panel and the trim panel. The energy absorbing device has a variable crush resistance based on a temperature of the energy absorbing device. A heater is operatively coupled to the energy absorbing device.

12 Claims, 6 Drawing Sheets

(51) Int. Cl.
  *B60R 21/015* (2006.01)
  *G01G 19/44* (2006.01)
  *G01G 19/52* (2006.01)
  *H05B 1/02* (2006.01)
  *B60R 21/01* (2006.01)
  *H05B 3/00* (2006.01)

(52) U.S. Cl.
  CPC ............ *G01G 19/44* (2013.01); *G01G 19/52* (2013.01); *H05B 1/0236* (2013.01); *B60N 2/0025* (2023.08); *B60N 2210/24* (2023.08); *B60R 2021/01252* (2013.01); *B60R 2021/0414* (2013.01); *H05B 3/0014* (2013.01)

(58) Field of Classification Search
  CPC . B60N 2/002; B60N 2/78; B60N 2/75; B60N 2/79; G01G 19/44; G01G 19/52
  USPC ......... 296/187.05, 153; 280/751; 297/411.21
  See application file for complete search history.

(56) References Cited

U.S. PATENT DOCUMENTS

| | | | | |
|---|---|---|---|---|
| 6,447,478 B1* | 9/2002 | Maynard | ................. | F03G 7/065 604/95.05 |
| 6,530,564 B1* | 3/2003 | Julien | ................. | A43B 13/186 267/80 |
| 7,108,316 B2* | 9/2006 | Barvosa-Carter | ....... | B60R 21/04 296/187.05 |
| 7,267,367 B2* | 9/2007 | Barvosa-Carter | ....... | B60R 21/04 296/187.05 |
| 7,503,621 B2* | 3/2009 | Mani | .................. | B60R 21/0428 296/187.05 |
| 7,997,632 B2* | 8/2011 | Browne | ................ | B62D 35/00 293/128 |
| 8,733,819 B1* | 5/2014 | Le | .......................... | B60J 5/0451 296/187.12 |
| 9,024,487 B1* | 5/2015 | Reif | ....................... | H02N 15/00 318/135 |
| 9,180,830 B1* | 11/2015 | Faruque | ............. | B60R 21/0428 |
| 9,550,466 B2* | 1/2017 | Gandhi | .................... | F16F 7/12 |
| 10,059,294 B1* | 8/2018 | Tay | ..................... | B60R 21/0428 |
| 2004/0195815 A1* | 10/2004 | Browne | ............... | B60R 21/04 280/753 |
| 2005/0218710 A1* | 10/2005 | Browne | ................ | A47C 31/11 297/452.64 |
| 2006/0032715 A1* | 2/2006 | Barvosa-Carter | ...... | B61G 11/12 267/116 |
| 2015/0086597 A1* | 3/2015 | Mallak | ................... | A01N 25/34 424/407 |
| 2015/0306992 A1* | 10/2015 | Jayasuriya | ............... | B60N 2/78 297/411.22 |
| 2018/0339614 A1* | 11/2018 | Han | ........................ | B60N 2/78 |
| 2019/0322234 A1* | 10/2019 | Li | ......................... | B60R 21/045 |

* cited by examiner

VEHICLE ENERGY ABSORBING DEVICE

BACKGROUND

A vehicle may house occupants of various sizes. Structures of the vehicle, such as an interior trim assembly for a vehicle door, may deform to control kinematics of an occupant, e.g., during a vehicle impact. A relatively large occupant may benefit from a stiffer interior trim assembly that absorbs more energy for a certain amount of deformation of the interior trim assembly and a relatively small occupant may benefit from a softer interior trim assembly that absorbs less energy for the same amount of deformation of the interior trim assembly.

For example, the interior trim assembly may include an armrest. The interior trim assembly may incudes a trim panel supporting the armrest and at least a portion of the armrest may be deformable relative to the trim panel to absorb energy during a vehicle impact when an arm or torso of an occupant impacts the armrest. In such an example, a relatively stiff armrest may absorb relatively more energy prior to abutting the structural structure, and thus is beneficial for a relatively large occupant. However, this relatively stiff armrest is not as easily deformed by a relatively small occupant. The relatively small occupant benefits from a relatively soft armrest that allows for more deformation at the lower impact forces applied by the small occupant.

DETAILED DESCRIPTION

Figure 1:
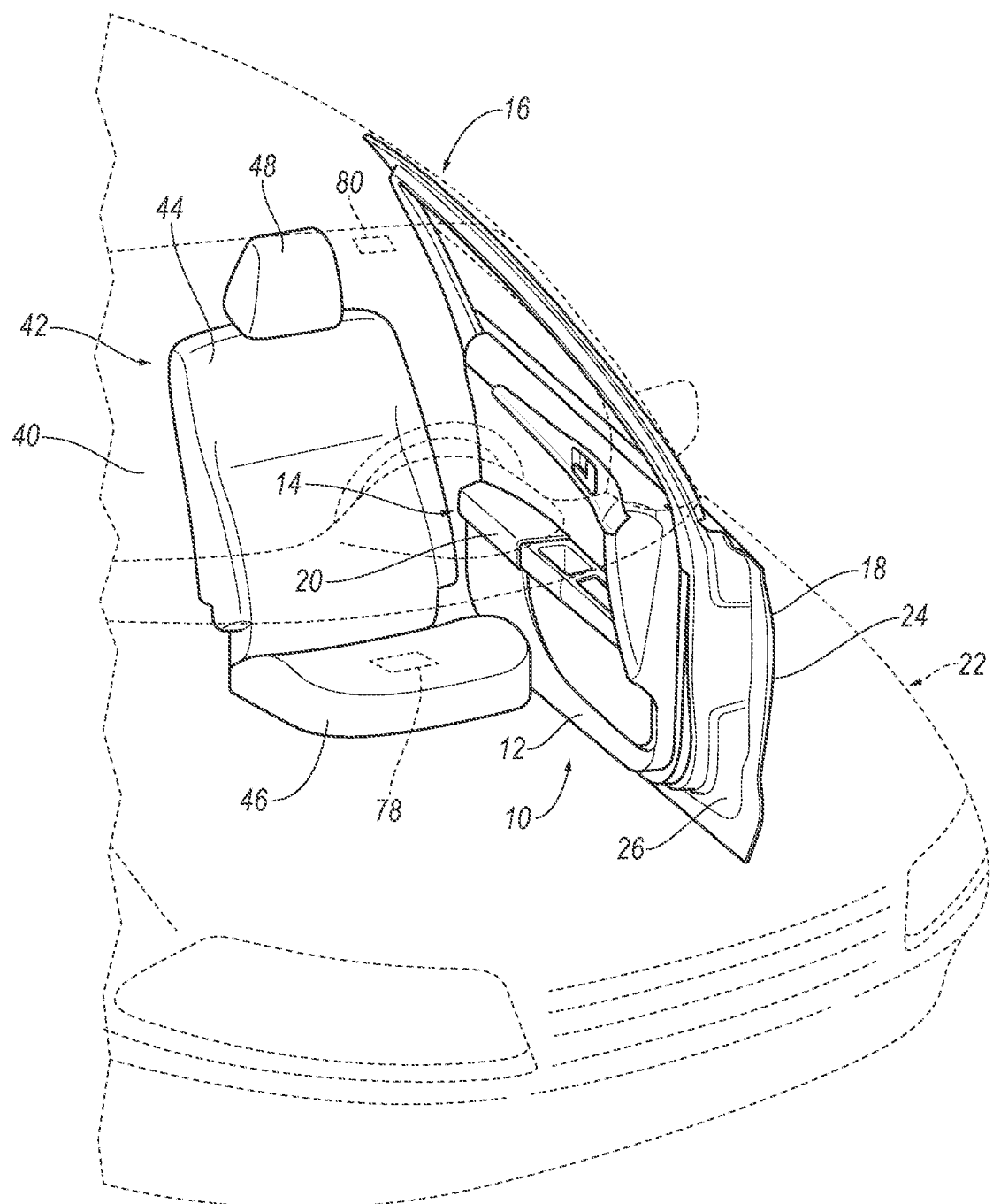
FIG. 1 is a perspective view of a vehicle having an door with a door panel and a trim assembly on the door panel.

A vehicle door interior trim assembly includes a trim panel and an armrest supported by the trim panel. The armrest includes an energy absorbing device including an inboard panel and an outboard panel. The outboard panel is between the inboard panel and the trim panel. The energy absorbing device has a variable crush resistance based on a temperature of the energy absorbing device. A heater is operatively coupled to the energy absorbing device.

The heater may include a power source in electrical communication with the energy absorbing device.

The heater may include a resistor embedded in the energy absorbing device.

The heater may include a resistor supported by the energy absorbing device.

The energy absorbing device may include a corrugated member between the inboard panel and the outboard panel.

The energy absorbing device may include a block of material having variable crush resistance based on temperature, the block being between the inboard panel and the outboard panel. The inboard panel and the outboard panel may be electrically conductive and the heater may be in electrical communication with at least one of the first panel and the second panel.

The crush resistance of the energy absorbing device may be inversely proportional to the temperature of the energy absorbing device.

A vehicle includes a trim panel and an armrest supported by the trim panel. The armrest including an energy absorbing device. The energy absorbing device includes an inboard panel and an outboard panel. The outboard panel is between the inboard panel and the trim panel. The energy absorbing device has a variable crush resistance based on a temperature of the energy absorbing device. The vehicle includes a processor and a memory storing instructions executable by the processor to heat the energy absorbing device based on a detected size of an occupant seated adjacent the armrest.

The vehicle may include an occupancy sensor in communication with the processor and configured to detect a size of an occupant seated adjacent the armrest.

The vehicle may include a heater in communication with the processor and operatively coupled to the energy absorbing device. The memory may store instructions executable by the processor to actuate the heater to heat the energy absorbing device to a first temperature upon detecting an occupant having a first size, and to actuate the heater to heat the energy absorbing device to a second temperature that is greater than the first temperature upon detecting an occupant having a second size that is less than the first size. The heater may include a power source in electrical communication with the energy absorbing device. The heater may include a resistor embedded in the energy absorbing device. The heater may include a resistor supported by the energy absorbing device.

The vehicle may include a seat adjacent the armrest and a weight sensor in communication with the processor and supported by the seat.

The energy absorbing device may include a corrugated member between the inboard panel and the outboard panel.

The energy absorbing device may include a block of material having variable crush resistance based on temperature, the block being between the inboard panel and the outboard panel. The inboard panel and the outboard panel may be electrically conductive and the heater may be in electrical communication with at least one of the first panel and the second panel.

The crush resistance of the energy absorbing device may be inversely proportional to the temperature of the energy absorbing device.

With reference to the Figures, wherein like numerals indicate like parts throughout the several views, a vehicle door interior trim assembly 10 (hereinafter referred to as trim assembly 10) for a vehicle 22 includes a trim panel 12 and an armrest 14 supported by the trim panel 12. The armrest 14 includes an energy absorbing device 28, 128. The energy absorbing device 28. 128 includes an inboard panel 58 and an outboard panel 60. The outboard panel 60 is between the inboard panel 58 and the trim panel 12. The energy absorbing device 28, 128 has a variable crush resistance based on a temperature of the energy absorbing device 28, 128. A heater 30 is operatively coupled to the energy absorbing device 28, 128.

The heater 30 actuates to heat the energy absorbing device 28, 128, reducing an amount of force required to crush the energy absorbing device 28. A computer 32 may actuate the heater 30 based on a detected size of an occupant seated in a seat 42 adjacent the armrest 14, e.g., such that during a vehicle impact the energy absorbing device 28, 128 may absorb more energy in the case of a larger occupant and less energy in the case of a smaller occupant.

The vehicle 22 may be any type of passenger or commercial automobile such as a car, a truck, a sport utility vehicle, a crossover vehicle, a van, a minivan, a taxi, a bus, etc. The vehicle 22 includes a passenger cabin 40 to house the occupant of the vehicle 22. The vehicle 22 includes one or more seats 42 in the passenger cabin 40.

The vehicle 22 includes a vehicle frame (not numbered) and a vehicle body (not numbered). The vehicle frame may be of a unibody construction in which the vehicle frame is unitary with the vehicle body (including frame rails, pillars, roof rails, etc.). As another example, the vehicle body and the vehicle frame may have a body-on-frame construction (also referred to as a cab-on-frame construction) in which the vehicle body and the vehicle frame are separate components, i.e., are modular, and the vehicle body is supported on and affixed to the vehicle frame. Alternatively, the vehicle frame and the vehicle body may have any suitable construction. The vehicle frame and the vehicle body may be of any suitable material, for example, steel, aluminum, and/or fiber-reinforced plastic, etc.

The vehicle body includes body panels partially defining an exterior of the vehicle 22. The body panels may present a class-A surface, i.e., a finished surface exposed to view by a customer and free of unaesthetic blemishes and defects. The vehicle body defines door openings.

With reference to FIG. 1, the vehicle 22 includes doors 16 that are openable for occupants to enter and exit a passenger cabin 40 through the door openings. One door 16 is shown in FIG. 1 and the vehicle 10 may include any suitable number of doors 16. One or more of the doors 16 may include the trim assembly 10.

The doors 16 are pivotally supported by the vehicle body at the door openings. Each door 16 includes a door panel 18 and the trim assembly 10. The door panel 18 is pivotally connected to the vehicle body at the door opening and the trim assembly 10 is supported on the door panel 18.

Figure 2:
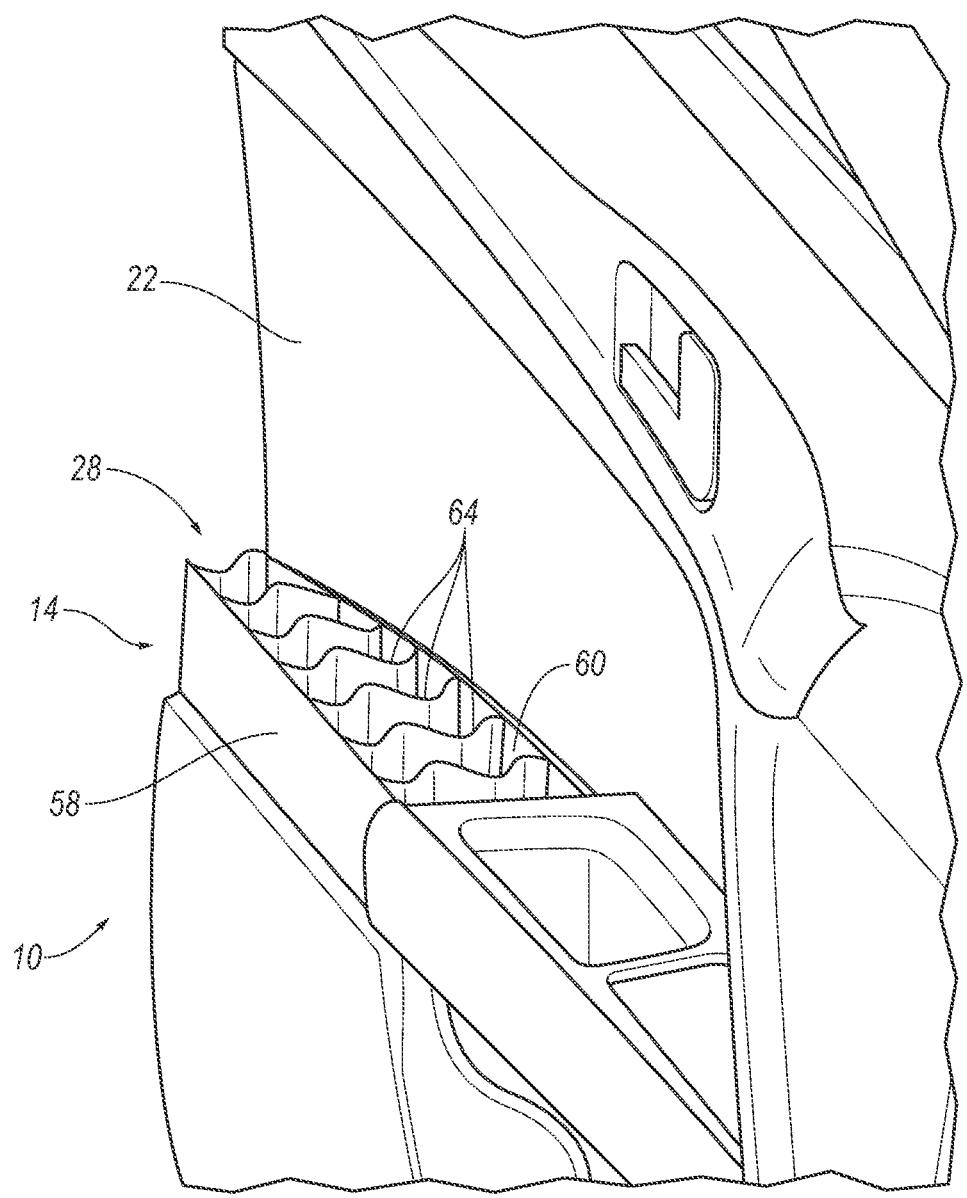
FIG. 2 is a perspective view of a portion of the trim assembly on the door, trim assembly including a trim panel and an armrest with a covering of the armrest removed to illustrate an energy absorbing device.

With reference to FIGS. 1 and 2, the trim assembly 10 includes the trim panel 12 and the armrest 14 supported by the trim panel 12. The armrest 14 includes the energy absorbing device 28, 128, as described further below. The armrest 14 may include a covering 20 (shown in FIG. 1) that covers the energy absorbing device 28, 128. The covering 20 may be, for example, vinyl, plastic, leather, wood, etc. The covering 20 may have a class-A surface facing the passenger cabin 40.

The trim assembly 10 is inboard relative to the door panel 18. Specifically, the door panel 18 has an exterior surface 24 facing vehicle-outboard and an interior surface 26 facing the passenger cabin 40. The trim assembly 10 is supported by interior surface 26 of the door panel 18 and faces the passenger cabin 40 when the door 16 is closed.

With reference to FIG. 1, the trim assembly 10 covers a portion of the interior surface 26 of the door panel 18. For example, the interior surface 26 of the door panel 18 may include openings that receive components of the door 16 such as electronics, sound dampeners, etc., during assembly of the door 16 and the trim assembly 10 covers these openings. The trim assembly 10 provides an aesthetic appearance to the door panel 18. At least a portion of the exterior surface 24 of the door panel 18 may be a class-A surface exterior to the vehicle 22 and the trim assembly 10 may include a class-A surface facing the passenger cabin 40 when the door 16 is closed. As set forth above, a class-A surface is a finished surface exposed to view by a customer and free of unaesthetic blemishes and defects.

The trim assembly 10 may be of a different material than the door panel 18. The trim assembly 10 may be a material or combination of materials suitable for an interior of the vehicle in addition to that described further below. For example, the trim assembly 10 may include an underlying metal, rigid plastic, etc., and may include a covering of vinyl, plastic, leather, wood, etc. The door panel 18 may be metal (such as steel, aluminum, etc.) or polymeric (such as fiber reinforced plastic composite, etc.).

The door 16 includes a window opening that is occupied by a window if the window is in a fully raised position. The window opening is defined the door panel 18 and may be defined, in part, by the trim panel 12 at a bottom edge of the window opening.

The vehicle 22 defines a vehicle-longitudinal axis A1, i.e., extending between a front and a rear of the vehicle 22. The vehicle 22 defines a cross-vehicle axis A2, i.e., extending between a left side and a right side of the vehicle 22. The cross-vehicle axis A2 and the vehicle-longitudinal axis A1 are perpendicular to each other. The front, rear, left side, and right side may be relative to an orientation of an operator of the vehicle 22. The front, rear, left side, and right side may be relative to an orientation of controls for operating the vehicle 22, e.g., a steering wheel, instrument panel, etc. The front, rear, left side, and right side may be relative to a forward driving direction when wheels of the vehicle 22 are all parallel with each other.

The seat 42 in FIG. 1 is shown as a bucket seat, but alternatively the seat 42 may be a bench seat or another type of seat. The seat 42 may include a seat back 44, a seat bottom 46, and a headrest 48. The headrest 48 may be supported by the seat back 44 and may be stationary or movable relative to the seat back 44. The seat back 44 may be supported by the seat bottom 46 and may be stationary or movable relative to the seat bottom 46. The seat back 44, the seat bottom 46, and/or the headrest 48 may be adjustable in multiple degrees of freedom. Specifically, the seat back 44, the seat bottom 46, and/or the headrest 48 may themselves be adjustable, in other words, adjustable components within the seat back 44, the seat bottom 46, and/or the headrest 48, and/or may be adjustable relative to each other. The seat 42 may be supported by a floor of the vehicle 22. The seat 42 is adjacent the trim assembly 10. In other words, an occupant seated on the seat 42 may contact the trim assembly 10. Specifically, the armrest 14 extends from the trim panel 12 toward the seat 42 so that an occupant of the seat 42 may rest an arm on the armrest 14. To put it another way, an outer surface 50 of the exterior panel 26 may face the seat 42.

The energy absorbing device 28, 128 absorbs energy, e.g., from movement of the occupant during a vehicle impact. The energy absorbing device 28, 128 is between the occupant of the seat 42 and the trim panel 12 and may be impacted by the occupant during a vehicle impact that urges the occupant toward the door 16. The energy absorbing device 28, 128 extends from the trim panel 12 into the passenger cabin 40 toward the seat 42.

Figure 3:
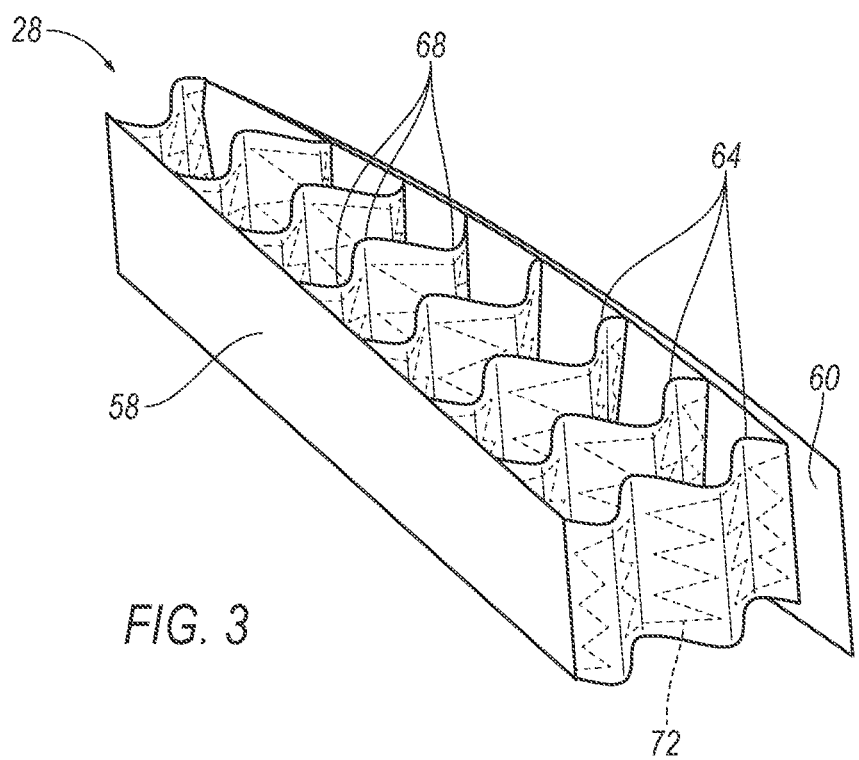
FIG. 3 is a perspective view of one example of the energy absorbing device as shown in FIG. 2.
Figure 4:
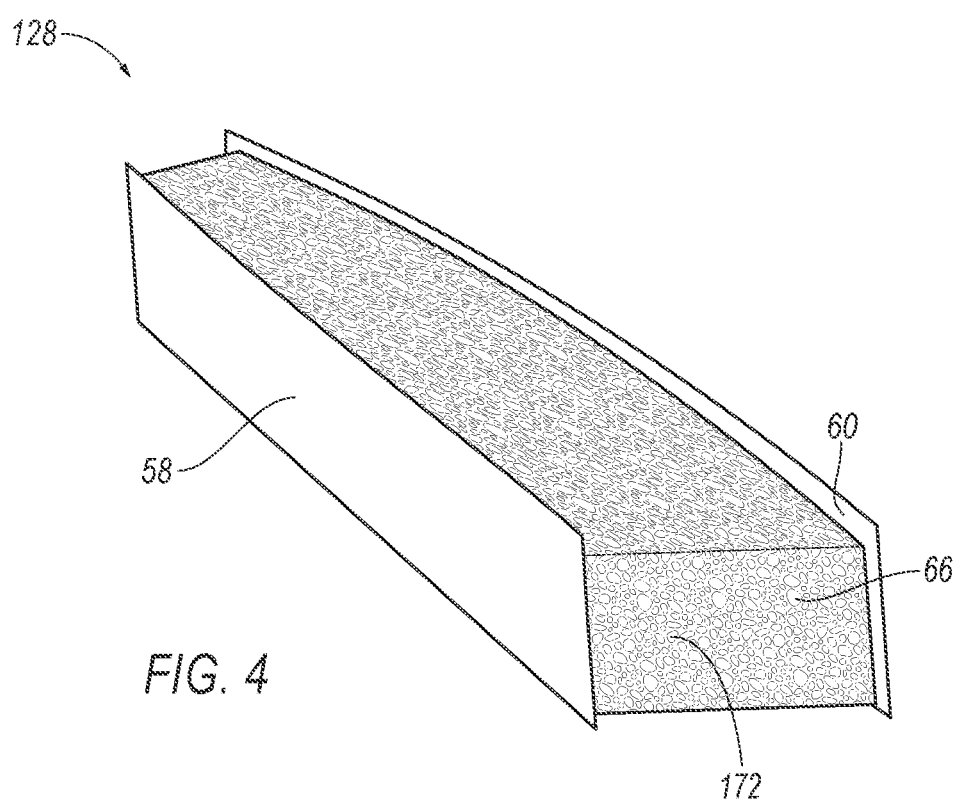
FIG. 4 is a perspective view of another example of the energy absorbing device.

One example of the energy absorbing device 28 is shown in FIGS. 2 and 3 and another example of the energy absorbing device is shown in FIG. 4. Common numerals are used to identify common features in FIGS. 2-4.

With reference to FIGS. 2-4, the energy absorbing device 28, 128 includes the inboard panel 58 and the outboard panel 60. The outboard panel 60 is between the inboard panel 58 and the trim panel 12. The outboard panel 60 may be connected to the trim panel 12. Specifically, the outboard panel 60 may be directly connected to the trim panel 12 with the outboard panel abutting the trim panel 12. As another example, the outboard panel 60 may be indirectly connected to the trim panel 12 through intermediate components between the outboard panel 60 and the trim panel 12.

The energy absorbing device 28, 128 has a variable crush resistance based on a temperature of the energy absorbing device 28, 128. To put it another way, an amount of energy absorbed when the energy absorbing device 28, 128 is deformed a certain amount varies as the temperature of the energy absorbing device 28, 128 changes, e.g., a Young's modulus of the energy absorbing device 28, 128 varies as the temperature of the energy absorbing device 28, 128 changes. For example, the crush resistance of the energy absorbing device 28, 128 may be inversely proportional to the temperature of the energy absorbing device 28, 128. To put it another way, an amount of energy absorbed when the energy absorbing device 28, 128 is deformed a certain amount decreases as a temperature of the energy absorbing device 28, 128 increases, and vice versa. The inverse proportionality may be linear or curved when graphed over various temperatures/energy absorption.

The inboard panel 58 and the outboard panel 60 of the energy absorbing device 28, 128 are shown in FIGS. 2-4. The inboard panel 58 and the outboard panel 60 may be plastic, metal, or any other suitable material or combination of materials. The outboard panel 60 is spaced from the inboard panel 58. The inboard panel 58 and the outboard panel 60 may be electrically conductive. For example, the inboard panel 58 and the outboard panel 60 may be copper, or any other suitable electrically conductive material. As another example, an electrical conductor, such as a copper plate, may be fixed to the inboard panel 58 and the outboard panel 60.

The energy absorbing device 28, 128 may include a member, e.g., a corrugated member 64 (shown in FIGS. 2-3) or a block member 66, i.e., a block of material, (shown in FIG. 4), etc., having variable crush resistance based on a temperature of the energy absorbing device 28, 128. The member 64, 66 may be a shape memory polymer (SMP) or any other suitable material, as described further below. The member 64, 66 is between the inboard panel 58 and the outboard panel 60. Specifically, the member 64, 66 may extend from the outboard panel 60 to the inboard panel 58 and may abut both the outboard panel 60 and the inboard panel 58.

With reference to the embodiment of the energy absorbing device 28 shown in FIGS. 2-3, the corrugated member 64 deforms to absorb energy. An amount of energy absorbed by the corrugated member 64 may depend on a frequency, amplitude, orientation, etc., of corrugations 68 of the corrugated member 64. The corrugations 68 may be elongated perpendicular to between the inboard panel 58 and the outboard panel 60, as shown in FIGS. 2-4. The corrugations 68 may be elongated between the inboard panel 58 and the outboard panel 60 and/or in other orientations (not shown). The corrugated member 64 may be arcuate, e.g., a wave shape, in cross section. The corrugated member 64 may be angular, e.g., a "W" shape, in cross section. The corrugated member 64 may be a combination of arcuate and angular.

With reference to the embodiment of the energy absorbing device 128 shown in FIG. 4, the block member 66 deforms to absorb energy. The block member 66 may be a cuboid, or any other shape.

Figure 5:
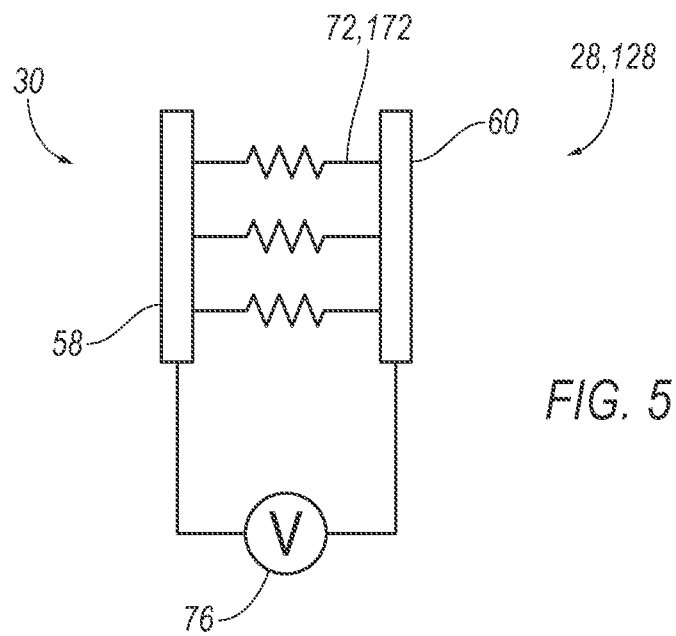
FIG. 5 is a schematic of a heater.
Figure 6:
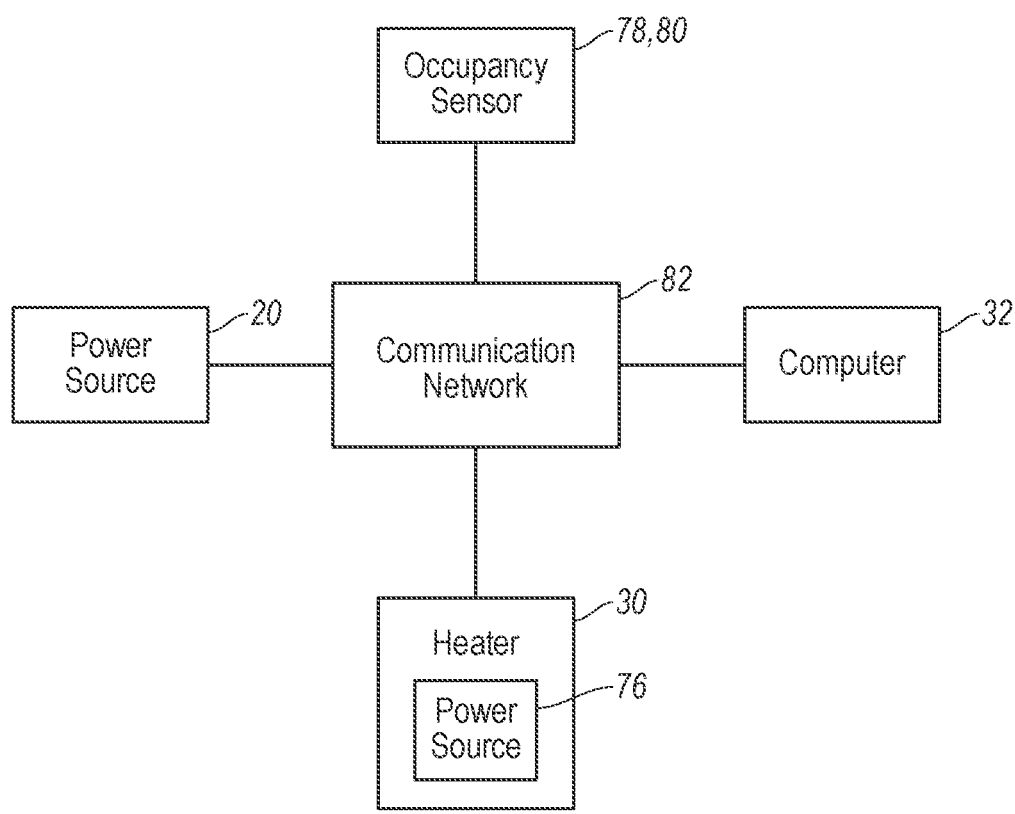
FIG. 6 is a block diagram of components of the vehicle.

The heater 30, shown in FIGS. 5 and 6, generates heat. The heater 30 is operatively coupled to the energy absorbing device 28, 128 to provide the generated heat to the energy absorbing device 28, 128. To put it another way, the heater 30 is fixed relative to the energy absorbing device 28, 128 such that heat energy generated by the heater 30 is transferred to the energy absorbing device 28, 128, e.g., the heater 30 is fixed relative to the corrugated member 64 or the block member 66 such that heat energy may be transferred from the heater 30 via conduction to the corrugated member 64 or the block member 66. For example, the heater 30 and the energy absorbing device 28, 128 may be in physical contact with each other and without a thermal insulator therebetween.

With reference to FIGS. 3-5, the heater 30 may include a resistor 72, 172. The heater 30 is shown schematically in FIG. 5. The resistor 72, 172 converts electricity to heat energy. The resistor 72, 172 may be wire, carbon fiber felt, carbon nanotube sponge, or any other suitable structure and/or material. As an example, the resistor 72, 172 may be a 3-D lattice structure formed by an additive manufacturing process, i.e., 3-D printing. The resistor 72, 172 may include a polymer with conductive fibers and/or nanoparticles embedded in the polymer.

The resistor 72, 172 may be supported by the energy absorbing device 28, 128, e.g., by the corrugated member 64 or the block member 66. For example, as shown in FIG. 2-3, the resistor 72 may be fixed to the corrugated member 64, e.g., with an adhesive, etc. The resistor 72 may be sandwiched between portions of the corrugated member 64, e.g., carbon fiber felt may be between the portions of the corrugated member 64 along the cross-vehicle axis A2. As another example, as shown in FIG. 4, the resistor 172 may by embedded in the energy absorbing device 128. The resistor 172 may be carbon nanotube sponge embedded in the block member 66. To put it another way, the block member 66 may be a polymer molded around the carbon nanotube sponge resistor 172.

The heater 30 may be in electrical communication with the inboard panel 58 and the outboard panel 60. To put it another way, the inboard panel 58 and the outboard panel 60 may be connected to the heater 30 such that electricity flows through the heater 30 when a voltage is applied across the inboard panel 58 and the outboard panel 60, e.g., when a negative electrical lead is connected to the inboard panel 58 and a positive electrical lead is connected to the outboard panel 60. For example, the resistor 72, 172 may be soldered, or otherwise electrically coupled, to the inboard panel 58 and the outboard panel 60.

The heater 30 may include a power source 76. The power source 76 provides electricity that is converted to heat by the heater 30. For example, the power source 76 may be a battery, e.g., one or more of a lithium-ion battery, a nickel-metal hydride battery, a lead-acid battery, or other device(s) capable of receiving, storing, and proving electrical energy. The battery may be a component of the vehicle 22, e.g., a vehicle battery in an engine compartment and used to power other vehicle components, such as a starter motor, a motor for vehicle propulsion, etc. The power source 76 may be in electrical communication with the energy absorbing device 28, 128, e.g., with the inboard panel 58 and the outboard panel 60.

The vehicle 22 may include one or more occupancy sensors 78, 80. The occupancy sensors 78, 80 are configured to detect a size of an occupant in the seat 42. For example, the occupancy sensor 78, 80 may be a weight sensor 78 supported by the seat 42 adjacent the trim assembly 10, e.g., supported by the seat bottom 46 the seat 42. As another example, the occupancy sensor 78, 80 may be a camera 80 positioned to capture images of the passenger cabin 40, e.g., supported by the instrument panel, roof, windshield, or any other suitable location of the vehicle 22, and positioned to capture an image of the occupant of the seat 42 adjacent the trim assembly 10.

The vehicle 22 may include a communication network 82. The communication network 82 includes hardware, such as a communication bus, for facilitating communication among vehicle components such as the heater 30, the computer 32, the occupancy sensor 78, 80, the power source 76, etc. The communication network 82 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 32 may be a microprocessor based computer implemented via circuits, chips, or other electronic components. For example, the computer 32 may include a processor, a memory, etc. The memory of the computer 32 may include memory for storing programming instructions executable by the processor as well as for electronically storing data and/or databases. Although shown as one computer in FIG. 6, it is to be understood that the computer 32 may include multiple computing devices.

Figure 7:
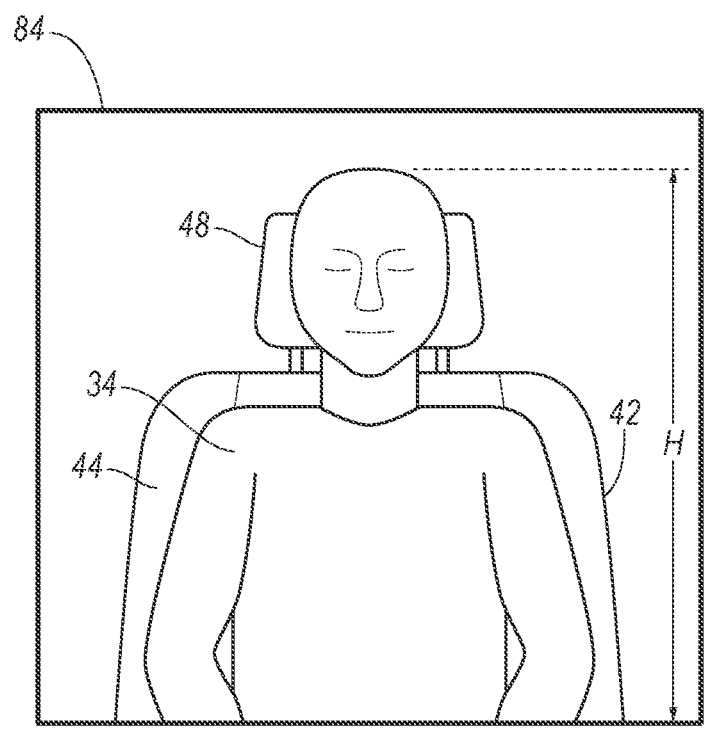
FIG. 7 is an example image captured by a camera of the vehicle.

The computer 32 may be programmed to detect a size of the occupant on the seat 42 adjacent the trim assembly 10, e.g., based on information from the occupancy sensor 78, 80. For example, the computer 32 may receive information from the weight sensor 78 supported by the seat 42 adjacent the trim assembly 10 indicating a weight of such occupant. As another example, the computer 32 may receive information from the camera 80, e.g., an image of the occupant seated on the seat 42 adjacent the trim assembly 10. The computer 32 may analyze the image using image recognition techniques to identify a height H of the occupant, e.g., relative to a frame 84 of the image, etc., as shown in FIG. 7.

The computer 32 may be programmed to heat the energy absorbing device 28, 128. For example, the computer 32 may transmit an instruction to the heater 30 via the communication network 82. The instruction may indicate a temperature and/or a temperature analog. For example, the instruction may indicate a voltage of electricity to provide to the resistor 72, 172 from the power source 76, e.g., the computer 32 may indicate a higher temperature by instructing a higher voltage be supplied to the resistor 72, 172. As another example, the instruction may indicate a duty cycle of pulse width modulation of electricity to provide to the resistor 72, 172, e.g., the computer 32 may indicate a higher temperature by instructing an increase in an amount of time in which electricity is supplied to the resistor 72, 172, and a decrease in an amount of time in which electricity is not supplied to the resistor 72, 172.

The computer 32 may be programmed to heat the energy absorbing device 28, 128 based on the detected size of the occupant on the seat 42 adjacent the trim assembly 10. Heating the energy absorbing device 28, 128 based on the detected size of the occupant enables the energy absorbing device 28, 128 to have a crush resistance that corresponds with the size of the occupant, e.g., a lower crush resistance for a smaller occupant or a higher crush resistance for a larger occupant. The computer 32 may actuate the heater 30 to heat the energy absorbing device 28, 128 inversely to the detected size of the occupant. For example, the computer 32 may heat the energy absorbing device 28, 128 to a first temperature upon detecting an occupant having a first size, and heat the energy absorbing device 28, 128 to a second temperature that is greater than the first temperature upon detecting an occupant having a second size that is less than the first size. As another example, the computer 32 may store a lookup table or the like associating various sizes of occupants, e.g., weights, heights, etc., with various temperatures and/or temperature analogs, e.g., voltages, duty cycles, etc., of electricity to provide to the resistor 72, 172. Greater weights and/or heights are associated with lower heating, and vice versa. An example lookup table is shown below:

TABLE 1

| Detected Weight (Pounds) | Voltage to Provide to Resistor (Volts) |
| --- | --- |
| <110 | 12 |
| 110-170 | 8 |
| 171-220 | 4 |
| >220 | 0 |

The lookup table may be populated based on empirical testing, e.g., the vehicle 22 may be crash tested with various sized crash test dummies and with power to the resistor 72, 172 supplied at various voltages, duty cycles, etc., e.g., such that an optimum temperature and/or temperature analog may be identified for use with each of the various sized crash test dummies.

Figure 8:
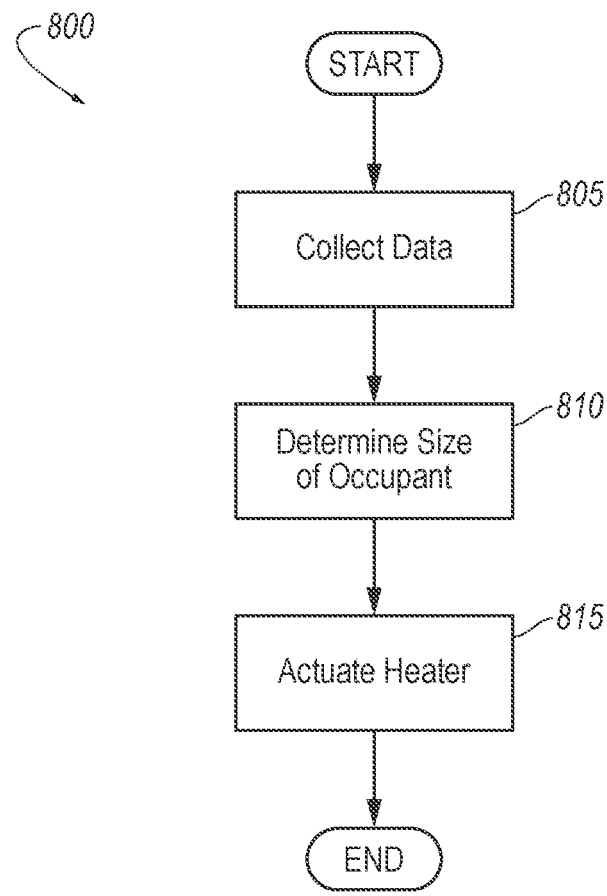
FIG. 8 is a process for controlling the temperature of the energy absorbing device.

FIG. 8 is a process flow diagram illustrating an exemplary process 800 for controlling the temperature of the energy absorbing device 28, 128. The process 800 begins in a block 805 where the computer 32 receives information from vehicle components, e.g., from the occupancy sensor 78, 80. The computer 32 may receive information throughout the process 800. Throughout the process 800 in the present context means substantially continuously or at time intervals, e.g., every 100 milliseconds.

Next at a block 810 the computer 32 identifies a detected size of the occupant seated on the seat 42 adjacent the trim assembly 10, e.g., based on information from the occupancy sensor 78, 80. For example, the computer 32 may identify the weight, the height, etc., of the occupant, e.g., as described herein.

Next at a block 815 the computer 32 actuates the heater 30 to the heat the energy absorbing device 28, 128 based on the detected size from the block 810. For example, the computer 32 may transmit an instruction to the heater 30 via the communication network 82, e.g., as described herein. The computer 32 may continue to heat the energy absorbing device 28, 128 until a different occupant is detected, e.g., having a different detected height and/or weight, until no occupant is detected, etc. After the block 815 the process 800 may end. Alternately, the process 800 may return to the block 805.

Computing devices, such as the computer 32, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a trim panel;
an armrest supported by the trim panel;
the armrest including an energy absorbing device, the energy absorbing device including an inboard panel, an outboard panel abutting and directly connected to the trim panel, and a member between the inboard panel and the outboard panel, the member abutting the inboard panel and the outboard panel, the outboard panel being between the inboard panel and the trim panel;
the armrest including a covering that covers the inboard panel;
the energy absorbing device being between the covering and the trim panel;
the energy absorbing device having a variable crush resistance based on a temperature of the energy absorbing device, the variable crush resistance being defined by the Young's modulus of the energy absorbing device;
a heater in communication with the processor and operatively coupled to the energy absorbing device; and
a processor and a memory storing instructions executable by the processor to:
actuate the heater to heat the energy absorbing device to a first temperature upon detecting an occupant having a first size; and
actuate the heater to heat the energy absorbing device to a second temperature that is greater than the first temperature upon detecting an occupant having a second size that is less than the first size.

2. The vehicle of claim 1, further comprising an occupancy sensor in communication with the processor and configured to detect a size of an occupant seated adjacent the armrest.

3. The vehicle of claim 1, wherein the heater includes a power source in electrical communication with the energy absorbing device.

4. The vehicle of claim 1, wherein the heater includes a resistor embedded in the energy absorbing device.

5. The vehicle of claim 1, wherein the heater includes a resistor supported by the energy absorbing device.

6. The vehicle of claim 1, further comprising a seat adjacent the armrest and a weight sensor in communication with the processor and supported by the seat.

7. The vehicle of claim 1, wherein the member is a corrugated member abutting the inboard panel and the outboard panel.

8. The vehicle of claim 1, wherein the member is a block of material having variable crush resistance based on temperature, the block abutting the inboard panel and the outboard panel.

9. The vehicle of claim 8, wherein the inboard panel and the outboard panel are electrically conductive and the heater is in electrical communication with at least one of the inboard panel and the outboard panel.

10. The vehicle of claim 1, wherein the crush resistance of the energy absorbing device is inversely proportional to the temperature of the energy absorbing device.

11. The vehicle of claim 1, wherein the covering has a class-A surface positioned to face a passenger cabin.

12. The vehicle of claim 1, wherein the covering has a shape that matches a shape of the energy absorber at the inboard panel and a top of the energy absorber.

* * * * *